B. S. AIKMAN.

PUMP AND PUMPING SYSTEM.

APPLICATION FILED DEC. 1, 1919.

Reissued Sept. 7, 1920.

14,946.

3 SHEETS—SHEET 1.

Witnesses;
W. H. Kilroy
Harry R. L. White

Inventor:
Burton S. Aikman
By Brown Boucher and Denner Attys.

B. S. AIKMAN.

PUMP AND PUMPING SYSTEM.

APPLICATION FILED DEC. 1, 1919.

Reissued Sept. 7, 1920.

14,946.

3 SHEETS—SHEET 2.

Witnesses:

W. P. Kilroy

Harry R. L. White

Inventor:

Burton S. Aikman

By Brown Boardman & Dunner

Attys.

B. S. AIKMAN.

PUMP AND PUMPING SYSTEM.

APPLICATION FILED DEC. 1, 1919.

Reissued Sept. 7, 1920.

14,946.

3 SHEETS—SHEET 3.

Witnesses:

W. F. Kilroy

Harry R. L. White.

Inventor:

Burton S. Aikman.

By Brown Berliner & Dreiner Attys.

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

PUMP AND PUMPING SYSTEM.

14,946. Specification of Reissued Letters Patent. Reissued Sept. 7, 1920.

Original No. 1,253,558, dated January 15, 1918, Serial No. 51,524, filed September 20, 1915. Application for reissue filed December 1, 1919. Serial No. 341,805.

*To all whom it may concern:*

Be it known that I, BURTON S. AIKMAN, a citizen of the United States, residing at Milwaukee, in the county of Milwaukee and State of Wisconsin, have invented a certain new and useful Improvement in Pumps and Pumping Systems, of which the following is a full, clear, concise, and exact description, reference being had to the accompanying drawings, forming a part of this specification.

My invention relates to pumps and pumping systems and contemplates an improved apparatus which may be employed as an isolated plant for furnishing water to a residence or an industrial establishment from a nearby source, such as a well.

It is the purpose of my invention to provide an improved system which supplies water "fresh from the well," that is, without the intervention of a storage or reserve tank, and which will be under "faucet control," by which I mean that the flow of water is controlled by the acts of opening and closing the faucets which form the supply outlets of the system.

To supply water fresh from the well and to maintain the flow of water under faucet control is broadly a matter of prior art. The apparatus and systems heretofore known and used were, however, subject to inherent difficulties due to the fact that the pneumatic control employed led to frequent misoperations, such as are commonly called "blow overs," where the system becomes cleared of water and the compressed air employed as an operating medium is wasted.

Faucet control of water delivery in a system employing a single cylinder pump is shown for the first time in my co-pending application, Serial No. 50,941 filed September 16, 1915.

Faucet control of a water supply system presents certain problems not encountered in open pumping. The stream of water from the faucet must be steady. This was secured previously by two cylinders which operated alternately. In the present system I provide a single cylinder pump and an air spring or auxiliary pumping chamber to fill in the gap between the discharge strokes of the single pumping cylinder.

A further problem is a requirement, the necessity for which does not arise in open pumping; namely, that the valves of the pump be made so that they will prevent leakage either of air or of water. In the present case the main valves are all provided with yielding faces and seat in such a manner that the pressures which they are to retain tend to hold them tight upon their seats.

Another problem in the matter of faucet control is the matter of completing the throw of the air valve mechanism from air admission to exhaust position, or vice versa. In open pumping the rise and fall of water in the pump is quite rapid and no particular difficulty is encountered in shifting the air valve or valves. In a faucet controlled system the flow of water may cease or be greatly diminished, as by the closing of the faucets just at the critical point in the operation of the pump where starting of the valve shifting motion should begin. Consequently, unless some means is provided for making this shifting operation independent of the rate of water discharge, the pump will center and the air will blow away, leaving the system dead. Some means must be provided for starting the valve shifting operation at a predetermined stage of operations, such for instance as low level on discharge or high level on filling of the pump, and some means must be provided for insuring a complete operation or full stroke of the valve operating mechanism after the shifting operation is initiated.

A further requirement is a valve shifting means which shall invariably have sufficient power to operate the valve mechanism even on high air pressure. As previously explained, where the air valves are held to seat by pressure, it is essential that the means for shifting the valves be invariably powerful enough to move the valves regardless of the pressure in the pump. This I accomplish by the use of a pressure motor operated by the same fluid pressure which tends to hold the valves to seat.

The conjoint use of the valves held to seat by pressure and the fluid pressure motor for pulling the valves from seat against pressure, as herein described and disclosed, meets the requirements above outlined, namely, tightness of the valves, full stroke and snap operation of the valves, and means independent of the lift for invariably shifting the valves.

According to my invention there is provided a single water chamber alternately subject to air pressure and relieved therefrom, the alternations being secured by the actuations of valve mechanisms, which in turn, are dependent, on the one hand, directly and mechanically upon the fall of the water in the chamber, and on the other hand upon a positively operating time element device.

It will be understood that the system is constantly under pressure, and it is, therefore, a further object of my invention to provide an apparatus which will be as free from leaks as possible, which operates with a minimum consumption of air, and which operates reliably and positively.

Notwithstanding the gradual rise and fall of the water in the chamber, I provide means for suddenly actuating the valve mechanism, an especially desirable feature.

My invention is illustrated in the accompanying drawings, in which.

Figure 2:
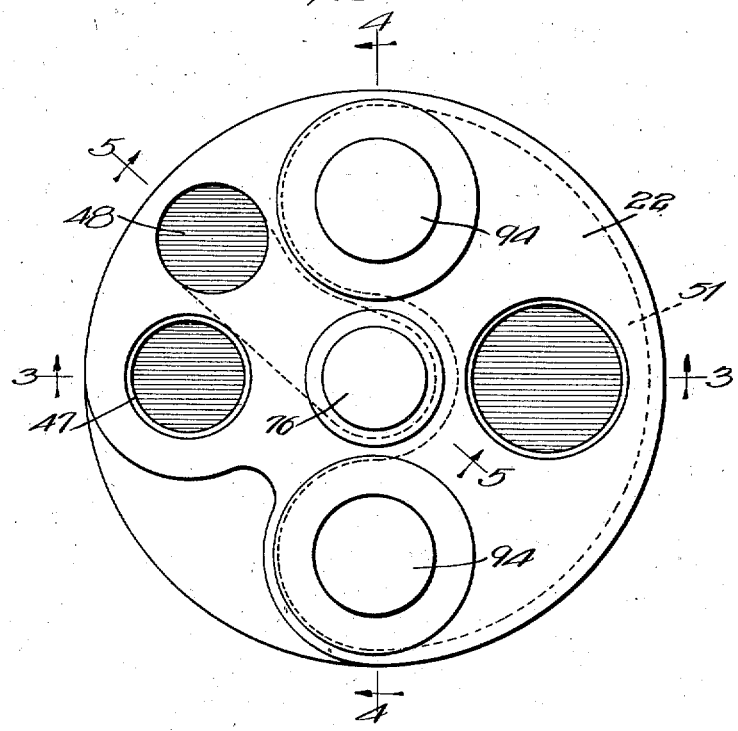
Fig. 2 is a plan view of the pump.
Figure 5:
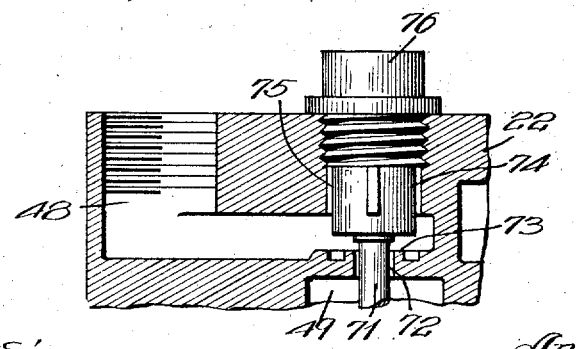
Figure 3:
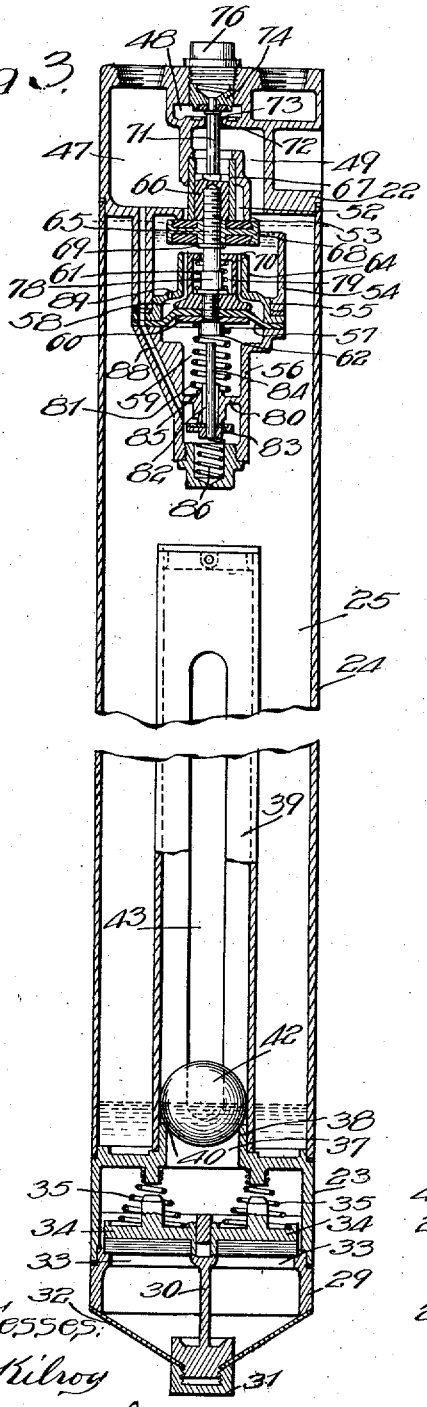
Fig. 3 is a vertical axial sectional view taken on the plane of the line 3—3 of Fig. 2 and looking in the direction indicated by the arrows.
Figure 4:
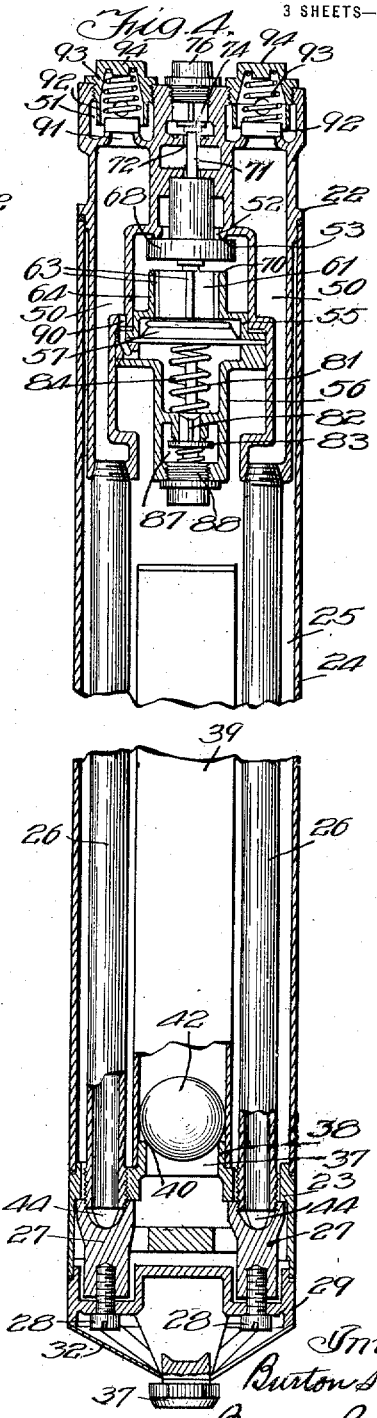

Fig. 4 is a vertical axial sectional view taken on the plane of line 4—4 of Fig. 3 and looking in the direction indicated by the arrows; and Fig. 5 is a partial sectional view taken on the plane of the line 5—5 of Fig. 2 and looking in the direction indicated by the arrows, Figs. 2 and 5 being drawn on a larger scale than Figs. 3 and 4.

Figure 1:
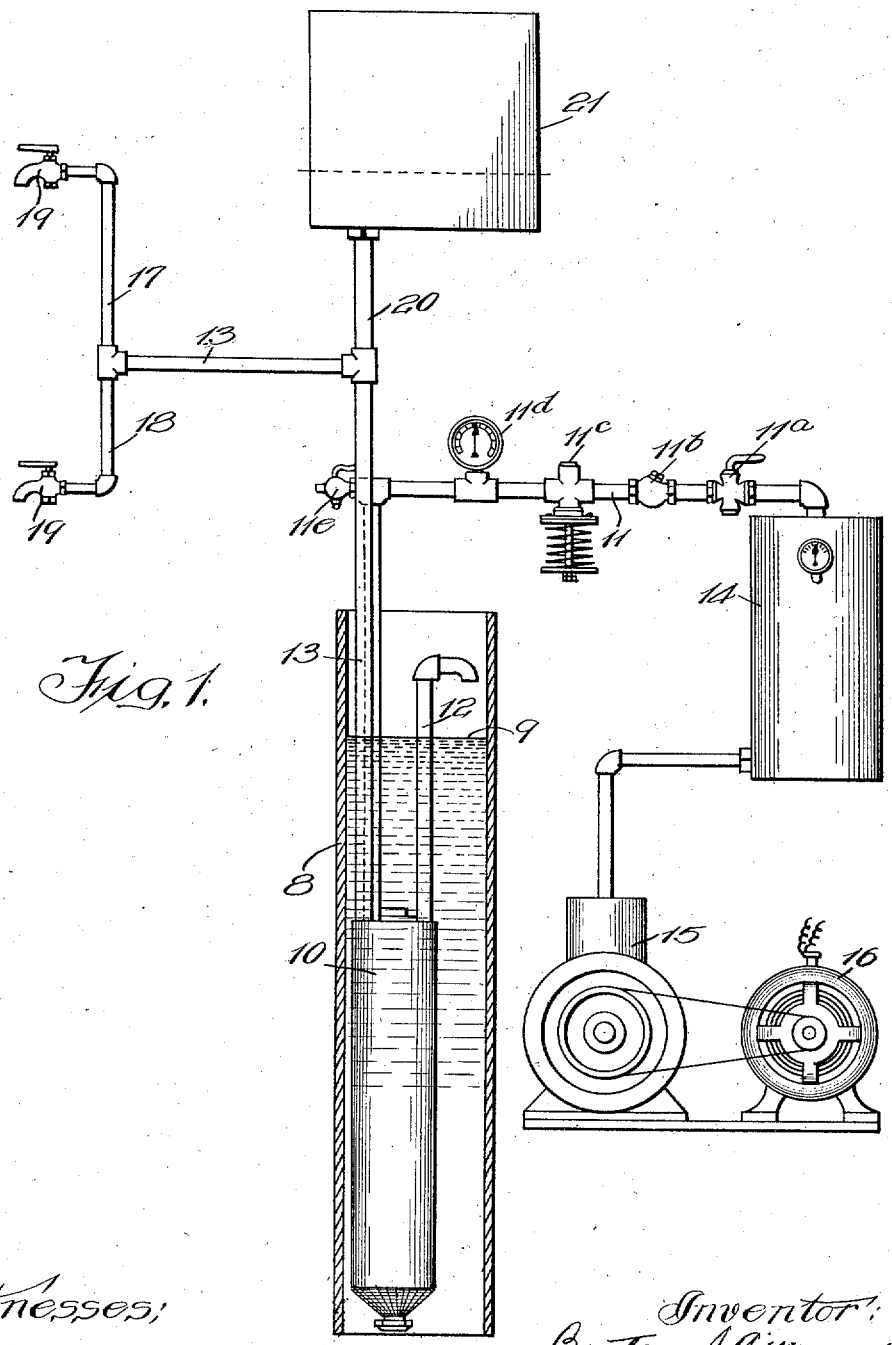
Figure 1 is a more or less diagrammatic view illustrating the system as a whole.

Referring first to Fig. 1, which, as before stated, is diagrammatic, it will be seen that the well curbing is illustrated at 8, the water level being indicated at 9. The pump structure, which I have indicated broadly by the reference character 10, is disposed in the well at a suitable distance below the water level therein, as will be described.

The pump structure has leading therefrom three pipes, an air pressure pipe 11, an exhaust pipe 12, and a water discharge pipe 13. The air pressure pipe 11 is connected with a compressed air tank 14, in which air is compressed by means of a compresser 15, operated, for instance, by an electric motor 16. It will be clear to those skilled in the art that the compresser 15 may be operated by any suitable means, such as a gas engine or steam engine, and if desired, means may be provided for automatically starting and stopping the prime mover dependent upon the fall and rise of pressure in the tank 14. In the pipe 11 the cut off valve $11^a$, air strainer $11^b$, reducing valve $11^c$, gage $11^d$, and drain cock $11^e$ are provided.

The water discharge pipe 13 leads to various branch pipes 17 and 18, each of which in turn leads to an outlet faucet 19. By means of a pipe 20 the discharge pipe 13 is connected with a chamber 21, called an "air spring" and closed except for the entry pipe 20, for a purpose which will be pointed out presently.

It will now be understood that this system represents an isolated plant for installation in a residence, for instance. The water discharge pipe leads from the well conveniently nearby, to the distribution pipe in the building, and the compressor, motor, compressed air tank and chamber are suitably housed in any convenient way.

As before pointed out, air pressure is constantly maintained upon the system. It is therefore necessary to maintain a certain pressure between predetermined minimum and maximum limits in the compressed air tank 14, this being done by the proper starting and stopping of the compressor 15, either manually or automatically. It has been my experience that, a proper compressed air tank being provided, it is necessary in employing a distribution system for an ordinary residence, for instance, merely to operate the compressor intermittently, say every two or three days, for a short time, in order to keep the pressure in the compressed air tank within the desired limits.

It will appear as this description proceeds that with the pressure properly maintained upon the system, everything is at rest so long as all the outlet faucets of the system are closed, but as soon as one of them is opened the pumping mechanism will operate to maintain continuous the flow which immediately commences. When the faucet is again closed the apparatus comes to rest and it will appear that the feed has been direct from the well with the proper pressure to distribute it to whatever points desired.

I refer now to Figs. 2 to 5 inclusive, to describe the pumping mechanism. A head member 22 and a primary base member 23, both of circular form, are jointed by a cylindrical housing 24, which forms a water chamber 25. As illustrated in Fig. 4, the head member 22 and the primary base member 23 are tied together by means of two pipes 26—26, which thread into the head member 22 and pass through openings in the primary base member 23, the lower ends of these pipes being screw threaded for the reception of nuts 27 which, when tightened, clamp the housing 24 firmly in place to form a watertight and airtight compartment. Secured to the under side of the primary base member 23, by means of screws 28—28, is the secondary base member 29, which has extending downwardly therefrom a central boss 30 to which a nut 31 is screw threaded, a conical screen 32 being clamped between the nut 31 and the boss 30 and thus held against the under side of the secondary base member 29. The secondary base member 29 is provided with two water inlet openings 33—33, each of which is controlled by a lift valve 34, normally held seated by means of springs 35—35, disposed between the respective valves and the primary base member 23.

The primary base member 23 is provided with an axial opening 37, which is surrounded by an upwardly extending boss 38, a cylinder 39 being supported upon and extending upwardly from said boss, as clearly shown in Figs. 3 and 4. The top of the boss 38 forms a valve seat 40, and this valve seat is adapted to be engaged by the ball float valve 42, which is confined within the cylinder 39. As shown in Fig. 3, the top of the cylinder 39 is closed for the proper retention of the ball float valve 42. The cylinder 39 is provided with elongated vertical slots 43, through which the water may pass inwardly and outwardly, as will be described. Entrance of water into the chamber 24 is thus provided through the screen 32, openings 33—33, opening 37, and slots 43—43. The exit of water from the chamber 24 is provided for through the slots 43—43, the opening 37, the passageways 44—44, formed by the spider construction of the top of the nuts 27—27, and the pipes 26—26, the further course of the water being later described.

The head member 22 is provided with an atmosphere passageway 47, the compressed air inlet passageways 48 and 49, the primary water chambers 50—50, and the secondary water chamber 51. These passageways and chambers are isolated from each other, as will be described, the atmosphere passageway being connected with the pipe 12, the compressed air inlet passageway 48 being connected with the pipe 11, and the secondary water chamber 51 being connected with the discharge pipe 13.

Referring first to the exhaust passageway 47, it will be seen that it is so fashioned as to lead to the annular opening 52 in the bottom of the head 22, a valve seat 53 surrounding this opening.

Supported from the under side of the head 22 is an annulus 54, disposed coaxially with the cylinder 24. This annulus forms a water chamber 99 and supports a diaphragm chamber structure which will now be described. This structure is composed of two primary parts 55 and 56, the former being mounted in and closing the bottom of the annulus 54 and the latter being secured to the under side of the former with the diaphragm 57 clamped between the two. Thus, the diaphragm has on its upper side the diaphragm chamber 58, and on its lower side the diaphragm chamber 59. The central portion of the diaphragm 57 is clamped between a plate 60 and a cup member or spring cage 61 by means of a screw 62. This cup member or cage is guided, by means of ribs 63—63, in the rim 64 of the diaphragm chamber part 55.

The water chamber or trap 99 formed by the annulus 54 and bottom plate 55 has its upper rim below the exhaust passage 52 so that the incoming water overflows the rim of the annulus at each filling stroke. The top edge or valve seat 70 of the upwardly extending rim 64 lies below the edge or rim of the annulus 54 so that the water which is trapped above the rim 70 is forced down into the motor diaphragm chamber 58 at each downward movement of the diaphragm. Upon upward movement of the diaphragm the water or part of it is first expelled through a restricted opening 90, as will be described later and as the valve face 96 leaves the seat 70 the pressure is relieved within the motor diaphragm chamber 58 as will be described later. The forcing of the water through the opening 89 provides sufficient delay of the shifting of the valves to permit the chamber to fill with water. This motor chamber 58 and its adjuncts thus forms in effect a liquid dash pot for securing the desired delay in the shifting of the valves.

A valve stem 65 is screwed into a guide block 66, which, as illustrated in Fig. 3, is mounted for reciprocation in a sleeve 67, disposed coaxially in the opening 52. A valve 68, double faced with a yielding material such as rubber so that it acts as a valve on both sides, is clamped upon the valve stem 65 between the block 66 and a collar 69. The upper valve face coöperates with the valve set 53, and the lower face coöperates with the valve seat 70 formed at the top of the rim 64, as will be described presently.

Mounted so as to be engaged by the block 66 is a valve stem 71, which connects the compressed air passageways 48 and 49. A valve seat 73 surrounds the passageway 72, and a valve 74, carried upon the stem 71, coöperates with this valve seat. The face of the valve 74 is also formed of a yielding material such as rubber. The valve 74 is guided in a central opening 75 at the top of the head member 22, which opening is closed by a plug 76, between which and the valve a spring 77 is disposed.

The lower end of the stem 65 extends downwardly into the cup member 61, wherein it is provided with a head 78, adapted to be engaged by the bottom of the cup member or cage as illustrated in Fig. 3. This cup member or cage is made in the form of a spider, in order to permit of the insertion of this head member. A spring 79 is disposed between a collar 95 on the head member and the under side of the top of the cup member or cage.

The bottom of the diaphragm chamber 59 is closed by a partition 80, between which and the under side of the diaphragm 57 a spring 81 is disposed. An opening 82 is provided centrally in the partition 80, this opening being controlled by a relief valve 83, carried upon a stem 84, guided in the opening 82, by means of ribs or lands 85 on the valve stem 84. As will be described, the top of the stem 84 is adapted to be engaged by the screw 62, in the downward movement of the diaphragm, to open the valve 83 against the tension of the spring 86. The chamber 87 below the partition 80 is connected by means of a small passageway 88 with the atmosphere passageway 47.

The upper diaphragm chamber 58 is provided with a restricted outlet 89, which affords a time element in the return of the diaphragm 57 from its lower to its upper position, the interval thus provided for being utilized for the refilling of the pump.

The operation of my pump and system is as follows:

Let it be assumed that the pump is submerged in the water of the well as illustrated in Fig. 1 and that the proper pressure is supplied by the tank 14. As soon as one of the faucets 19 is opened water at once flows therefrom and in doing so relieves the pressure within the air spring 21, thus relieving the back pressure of the water in the pump chamber 25 and permitting the discharge of water therefrom. Assuming that the pump is on the discharge stroke the water inlet valves 34 are closed and held closed by pressure, the water discharge valves 92 are forced open by the discharge of water. The air admission valve 74 is held open by the stem 71 thereof being held by the block 66. The exhaust valve 68 is held closed, being applied to its seat by the spring 81, and also held by the pressure of the compressed air within the chamber 25. The relief valve 83 is closed and held closed by the pressure of the spring 86 so that the pressure of the water in the discharge main prevails in the motor chambers 59 (because of the communication through the passageway 90). The valve face 96 is away from the seat 70 so that the water caught in the annulus 54 communicates with the motor chamber 58.

In the condition shown in Figs. 3 and 4 the apparatus has just reached a point in the discharge stroke where the consignment of water in the chamber 24 has been driven therefrom by the action of compressed air entering by way of the passageways 48, 72 and 49. The water has reached its predetermined low level, as illustrated, and the ball float valve 42 has been seated upon the seat 40. As soon as this ball float valve has been seated the continued application of the compressed air is effective upon the upper side of the diaphragm 57 by way of the space between the cup member 61 and the rim 64. Previous to this, that is during the time that water was being forced out of the chamber 24, through the central opening 37 and upwardly through the pipes 26—26, the air pressure was not effective in its action upon the top of the diaphragm 57 for the reason that the pressure is also transmitted to the under side of the diaphragm by way of the passageway 90 leading from the diaphragm chamber 59 to one of the chambers 50, as shown in Fig. 4.

It will be obvious that while the expulsion operation is going on the water in the chambers 50 is under the pressure of the compressed air, and, since that pressure is transmitted to the under side of the diaphragm 57 by means of the passageway 90, the diaphragm will be balanced so far as effective air pressures are concerned and will be retained in its uppermost position by means of the spring 81. When, however, the action reaches the point illustrated in Figs. 3 and 4, the pressure of the motive fluid on the under side of the diaphragm 57 is cut off by the valve 42 and the pressure on the upper side of the diaphragm builds up until it easily overcomes the tension of the spring 81, and the pressure of the water in chamber 50. This moves the diaphragm 57 toward its lowermost position compressing the spring 79. The pressure of the compressed air in the chamber 25 is exerted upon the water which is trapped in the cup formed by the annulus 54 and as the pressure in the chamber 25 becomes higher than the pressure in the water discharge chamber 50 the difference in pressures upon the motor diaphragm ovecomes the springs 81 and 79 forcing the diaphragm down, injecting some of the water trapped in the annulus 54 down into the motor chamber 58 and ejecting some of the water in the motor chamber 59 out of the orifice 90. The first movement of the diaphragm 62 and attached spring cage 61 downward removes the effect of the spring 81 upon the exhaust valve stem, so that the valve 68 is held against the exhaust valve seat solely by the pressure within the chamber 25. Further movement of the diaphragm and cage compresses the spring 79 between the top of the cage 61 and the head 95 on the end of the exhaust valve stem 65.

Further movement of the diaphragm 57 next causes engagement of the screw head 62 with the stem 84 of the relief valve 83 permitting the pressure in the chamber 59 and under the diaphragm 57 to escape to exhaust through the passageway 88. Then suddenly the motor diaphragm is raised to its full power and moves down very rapidly further compressing the springs 79, 81 and 86 and further opening the relief valve 83. The full power of the motor is developed at this stage in order to enable it to pull the exhaust valve off of its seat against the pressure of the compressed air in the chamber 25 tending to hold it upon its seat. The top of the cage 61 strikes the head 78 on the valve stem 65 cracking the valve from its seat. The spring 79 is at this time as fully compressed as the lost motion permits. As soon as the valve is cracked the pressure escapes from the chamber 25 rapidly and tends to equalize on both sides of the exhaust valve 68 until a point is reached where the difference in pressure upon the two sides of the valve are insufficient to overcome the tension of the compressed spring 79. Finally the spring overcomes the pressure holding valve 68 toward its seat and suddenly expands. In this downward movement of the diaphragm three changes occur. The valve 83 is moved to its open position by reason of the engagement of the screw 62 with the top of the stem 84. The valve 68 is brought down on the seat 70, because of the engagement of the top of the head 78 with the under side of the top of the cup member 61. The valve 74 is brought down on the seat 73. This action opens the water chamber to the atmosphere and closes off the compressed air to the water chamber 25. At the same time the under side of the diaphragm 57 is exposed to the atmosphere for exhaust. When these conditions are assumed the chamber 25 immediately commences to fill, check valves 34—35 opening under the head of water in the well, and this action continues until the valves are again reversed. I provide for this refilling period as follows: It will be seen that, as soon as the valves have been thrown in their lowermost position, the diaphragm 57 will immediately begin to rise under the influence of the spring 81. It is retarded in resuming this position, however, because the water in the diaphragm chamber 58 must all find its way out through the restricted passageway 89, since the large passageway between the cup member or cage 61 and the rim 64 has been closed by the valve 68. The nature of the connection between the valve stem 65 and the cup member 61, as has been described, permits of a considerable upward movement of the diaphragm 57 before the bottom of the cup member or cage engages the bottom of the head 78 to raise the stem. When the diaphragm is at the bottom of its stroke, valve face 96 of the valve 68 seats upon the rim or seat 70, the water above the rim 70 having here injected into the diaphragm chamber 58. As soon as the compressed air has escaped from the main pump chamber 25 (and this occurs very rapidly) the water from the well immediately flows into the pump due to the submergence pressure and tends at once to fill the chamber 25.

As the valve 68 is down upon its seat 70 and as the spring 79 tends to hold the valve in that position, and as the area of the valve is smaller than the area of the diaphragm, the pressure of the spring 81 upon the diaphragm 57 does not create sufficient internal fluid pressure in the chamber 58 to force the valve 68 upwardly off of the seat 70 and consequently a certain amount of delay is created in the closing of the exhaust valve which delay suffices for the filling of the pump chamber 25 from the well. The action of the time element creating the delay is as follows: When the valve face 69 is first brought against the valve seat 70 it will be recalled that the top of the cage has come into engagement with the head 78 of the stem 65 forcing the valve down. In other words the lost motion between these parts was taken up in one direction and before the valve face 69 can be forced off of the seat 70 the lost motion must be taken up in the reverse direction. The spring 79 having been compressed between the collar 95 and the top of the cage 91 now exerts pressure in two directions first the pressure on the valve 68 in a downward direction tending to hold the valve on the seat 70 and it exerts an upward pressure on the diaphragm 57 tending to compress the fluid in the motor chamber 58. The pressure of the spring 79 distributed over the small area of the valve face 69 seated on the port 70 is much greater per unit of area than is the pressure of the same spring per unit area distributed over the large area of the diaphragm 57. Consequently if no other influences operated and if the chamber 58 were otherwise tight the valve 68 would remain seated on the valve seat 70. However, I have provided means for permitting the fluid pressure within the chamber 58 to escape. The orifice 89 in the walls of the chamber 58 permits the fluid to escape. However, if no further means were provided the spring 79 would bring the diaphragm 57 up, discharge the liquid through the hole 89 and bring the bottom of the cage 61 against the bottom of the head 78. This would not open the admission valve 74 nor close the exhaust valve 68.

The spring 81 below the diaphragm 57, and the spring 86 working on the relief valve 83, aid the spring 79 in forcing the diaphragm upwardly to expel the liquid through the hole 89, and when the spring 79 has brought the cage 61 into engagement with the end of the head 78 the work of the spring 79 ceases and the valve 68 is free to rise from the seat 70, and the pressure of the spring 81 instead of being transmitted to the liquid is applied solely to the stem 65. The spring 86 aids the spring 81 to the limit of the upward movement of the valve 83. This occurs at substantially the same time that the lost motion is taken up between the cage 61 and the end of the valve stem 65.

The work of the spring 81 then consists in opening the admission valve 74 against the live air pressure above it and closing the exhaust valve 68. After the valve 74 is cracked from its seat it moves away easily and the spring 81 throws it suddenly causing a snap action shift of both valves 74 and 68. As pressure then enters the chamber 25 to discharge the water therein the pressure on the upper side of the diaphragm 57 quickly builds up to equal the pressure on the lower side thereof and the exhaust valve is then held to seat by the pressure of the compressed air. The spring 81 also aids but its work is mainly concerned with holding the admission valve 74 open and the exhaust valve 68 closed when there is no pressure on the pump and with the throw of the valves 74 and 68 as previously explained. The duration of this upward movement prior to the raising of the stem 65 is dependent upon the size of the opening 89, and I am therefore enabled to provide whatever time is necessary for refilling, dependent upon conditions.

It has been my experience that, with a structure built substantially along the lines of that illustrated in the drawings, and substantially of those proportions, submerged a few feet below the level of the water in the well, a period of about 1.5 seconds is required for the filling operation, and I therefore regulate the size of the aperture 89 to permit of a period of that time for the upward movement of the diaphragm 57 before the head 78 is engaged by the bottom of the cup member 61 to throw the valves in their upward position.

It is pertinent here to point out that the stem 84 of the valve 83 is not engaged until after the diaphragm 57 has made a considerable downward movement and, conversely, is released after a small portion of the upward movement of the diaphragm has been accomplished. The downward movement of the diaphragm and the opening of the valve 83 releases the water confined there, and in the upward movement of the diaphragm the valves closes, under the following tension of the spring 86, to retain the water above it.

It may be assumed that in this refilling operation which has been described the water reaches the level indicated by the dot-and-dash line, at which time the valves are reversed so as to close the chamber 25 to the atmosphere and open it to the compressed air.

It will be kept in mind that in the refilling operation the float valve 42 rises with the entering water and goes to the top of the cylinder 39, where it remains until the level of the water has been lowered to a point where it may take the ball valve down with it again. The continued application of the compressed air now forces out the water in the chamber 25, the water passing through the opening 37, the openings 44—44, the pipes 26—26, the chambers 50—50, and thence through the openings 91—91, past the check valves 92—92, and into the secondary water chamber 51, these check valves being held on their seats under normal conditions by means of the springs 93—93, disposed between the valves and the plugs 94—94.

From the chamber 51 the water passes to the distribution system by way of the pipe 13. This operation then continues until the float valve 42 is brought down to the seat 40, whereupon the valves are reversed and the operation hereinbefore described is repeated.

It is assumed, of course, that this operation which has been described takes place only when there is a withdrawal of water from the system. If all the outlets of the distribution system are closed, everything will be at rest since, although there is pressure on the top of the water in the chamber 25, there is no outlet for the water. When the water is forced out through the discharge pipe 13 it will be seen that, in addition to going to the distribution pipes 17 and 18, the water will also be forced into the air chamber 21, confining an air cushion above the water level formed therein, as indicated in dotted lines.

The speed with which the water chamber fills to the level of course depends upon the sizes of the inlet passageways and the head of the water in the well. As before indicated, with a structure as shown, the time is about 1.5 seconds. If the capacity of the discharge and distribution pipes is great enough this momentary cessation of pressure will be hardly perceptible at the faucets, particularly since the expulsion period, assuming one or more faucets to be open for a considerable length of time, consumes practically all of the time. However, in order that the gap in the flow may be properly filled in, I provide the air chamber 21, to which the part 20 delivers from the discharge pipe 13. Obviously, when the water in the discharge pipe 13 is under pressure, as it is practically all of the time, a certain amount of water is forced up into the chamber 21. This action compresses the air in the chamber and forms a cushion, which is maintained so long as the pressure is not relieved. As soon as the pressure is relieved, however, by the cessation of pressure in the pump with a faucet open, the air is given opportunity to expand and in doing so forces out the water which has become packed therein and provides a flow from the faucet during the refilling period of the pump. This chamber 21 will, of course, be distinguished from a storage tank, since all it does is to increase the capacity of the system and provide means for a certain amount of compression to be released for a very short period, about 1.5 seconds, at a time.

It will be understood that this water which is in the chamber 21 is directly a part of the discharge system, being located in effect directly between the well and the faucet, and the small consignment of water is constantly being changed. In this way a continuous flow from the faucets is insured.

I have found by experiment that the air in the chamber 21 is kept properly replenished by bubbles of air which follow the expulsion of water from the water chamber 25 of the pump structure, and that it is automatically relieved from an excess of air by the opening of a faucet, this latter action being instantaneous and imperceptible to the opening of the faucet. The air spring 21 thus operates like another pumping chamber in a double cylinder pump.

It will be seen that the lower level of the water in the water chamber positively determines the reversal of the valves, and that the upper level of the water is determined by a positively and uniformly operating time element. In this way reliable operation is secured and the desirable sudden action of the valve at the end of a refilling or emptying operation is effectively obtained. Suction may be applied on the pipe 12, if desired. Certain of the broad features of the present invention are disclosed and claimed in my prior copending application, Serial No. 50,941, filed September 16, 1915.

I have endeavored to embody the features of my invention in a simple structure involving a minimum number of parts of simple design, and some of the more limited of the appended claims are directed to these more specific features.

I claim:

1. In a pump, a water chamber, an auxiliary chamber having inlet and outlet valves said auxiliary chamber being connected with said water chamber, an exhaust port for said water chamber, a compressed air port for said water chamber, valves for said ports, pressure means for operating said valves, one side of said pressure means being exposed to the pressure in said auxiliary chamber to close the exhaust port and open the compressed air port, and the other side being exposed to the pressure in said water chamber to open the exhaust port and close the compressed air port, and a valve for controlling the connections between said chambers.

2. In a pump, a water chamber, an auxiliary chamber having inlet and outlet valves said auxiliary chamber being connected with said water chamber at the bottom of the latter, an exhaust port for said water chamber, a compressed air port for said water chamber, valves for said ports, pressure means for operating said valves, one side of said pressure means being exposed to the pressure in said auxiliary chamber to close the exhaust port and open the compressed air port, and the other side being exposed to the pressure in said water chamber to open the exhaust port and close the compressed air port, and a float valve for controlling the connections between said chambers.

3. In a pump, a water chamber, an auxiliary chamber having inlet and outlet valves said auxiliary chamber being connected with said water chamber, an exhaust port for said water chamber, a compressed air port for said water chamber, valves for said ports, pressure means for operating said valves, one side of said pressure means being exposed to the pressure in said auxiliary chamber, and the other side being exposed to the pressure in said water chamber, a valve for controlling the connections between said chambers, and a valve for controlling the application of the pressure in said water chamber to said pressure means.

4. In a pump, a water chamber, an auxiliary chamber having inlet and outlet valves said auxiliary chamber being connected with said water chamber, an exhaust port for said water chamber, a compressed air port for said water chamber, valves for said ports, pressure means for operating said valves, one side of said pressure means being exposed to the pressure in said auxiliary chamber, and the other side being exposed to the pressure in said water chamber, a valve for controlling the connections between said chambers, a valve for controlling the application of the pressure in said water chamber to said pressure means, and means for connecting the first named side of said pressure means to the exhaust.

5. In a pump, a water chamber, an auxiliary chamber having inlet and outlet valves said auxiliary chamber being connected with said water chamber, an exhaust port for said water chamber, a compressed air port for said water chamber, pressure means connected to one side with the auxiliary chamber, and on the other side connected with the interior of the water chamber by a main and a restricted passageway, a valve structure operated by said pressure means and controlling said exhaust and compressed air ports and said main passageway.

6. In a pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway, and an exhaust relief passage from the first named side of said pressure means.

7. In a pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway, and a float valve controlling the connection between said water chamber and said auxiliary chamber.

8. In a pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway to close the exhaust port, open the compressed air port, and open said main passageway in one direction and reverse the action in the opposite direction.

9. In a pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway to close the exhaust port, open the compressed air port and open said main passageway in one direction and reverse the action in the opposite direction, and to open a relief on the first named side of the pressure means in the latter direction.

10. In a pump, a water chamber, an auxiliary chamber having inlet and outlet valves said auxiliary chamber being connected with said water chamber. an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway to close the exhaust port, open the compressed air port, and open said main passageway in one direction and reverse the action in the opposite direction, and a float valve controlling the connection between the water chamber and said auxiliary chamber.

11. In the pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway, said valve structure being moved by the latter portion of the movement of said pressure means.

12. In a pump, a water chamber, an auxiliary chamber having inlet and outlet valves said auxiliary chamber being connected with said water chamber, an exhaust port for said water chamber, a compressed air port for said water chamber, pressure means connected on one side with the auxiliary chamber, and on the other side connected with the interior of the water chamber by a main and a restricted passageway, a valve structure operated by said pressure means and controlling said exhaust and compressed air ports and said main passageway, and a float valve controlling the connection between said water chamber and said auxiliary chamber, said float valve being confined for vertical movement in a cylinder through which water may pass.

13. In combination, a pumping chamber having water inlet and discharge valves, compressed air admission and exhaust valve means, a fluid pressure motor for operating the air valve means in one direction and a time controlled element governing the return only of said air valve means.

14. In combination, a pumping chamber having water inlet and discharge valves, an air admission valve, an air exhaust valve, spring means for applying the exhaust valve to its seat and a time controlled element governing the operation of said spring means.

15. In combination, a pumping chamber having water intake and discharge valves, an air admission valve, an air exhaust valve, spring means for opening the air admission valve and a time control device governing the operation of said spring means.

16. In combination, a pumping chamber having water admission and discharge valves, a compressed air admission valve, means governed by low level conditions of the water in the pumping chamber for closing the compressed air admission valve, means for opening the air admission valve and a time controlled element governing said latter means.

17. In combination, a pumping chamber having water admission and discharge valves, a compressed air admission valve, means controlled by low level conditions in the pumping chamber for closing said air admission valve, and time controlled means for opening said air admission valve.

18. In combination, a pumping chamber having water admission and discharge valves, an air admission port, an air admission valve adapted to be held against said port by the pressure of said compressed air, means controlled by low level conditions within the pump for permitting said valve to move to seat when the water has been discharged from the pumping chamber, time controlled means for opening said air admission valve, said means comprising a spring adapted to throw the air admission valve away from its seat.

19. In combination, a pumping chamber having water inlet and discharge valves, an air admission valve adapted to seat with the air tending to enter the pump chamber, an air exhaust valve adapted to seat with the air tending to leave the pump chamber, a fluid pressure motor for opening the exhaust valve against pressure and for closing the admission valve with pressure when water has been discharged from the pump chamber, and means for causing the opening of the admission valve against pressure and closing of the exhaust valve with pressure, said latter means having a time controlled element.

20. In combination, a pumping chamber having water inlet and discharge valves, an air admission valve adapted to seat with pressure tending to enter the chamber, and an air exhaust valve adapted to seat with pressure tending to leave the chamber, a fluid pressure motor controlled by low level conditions within the pumping chamber for seating the admission valve with pressure and opening the exhaust valve against pressure, spring means for opening the admission valve against pressure and seating the exhaust valve with pressure and a time controlled element governing said spring means.

21. In combination, a single pumping chamber having water inlet and discharge valves, an air admission valve, an air exhaust valve, said air valves being of the puppet-type, a fluid pressure motor for opening the exhaust valve when water has been expelled from the pumping chamber and means for opening the air admission valve a predetermined time interval after the opening of the exhaust valve.

22. In combination, a pumping chamber having water inlet and discharge valves, means for admitting compressed air to the pumping chamber, an exhaust valve, a fluid pressure motor controlled by discharge of water from the cylinder for opening the exhaust valve, and a time controlled element governing the closing of the exhaust valve.

23. In combination, a pumping chamber having water inlet and discharge valves, means for admitting compressed air to the pumping chamber, an air exhaust valve adapted to be held against its seat by the pressure of the compressed air within the pumping chamber, a fluid pressure motor for opening the exhaust valve against the pressure of the air in the pumping chamber, and time controlled means governing the application of said exhaust valve to its seat.

24. In combination, a pumping chamber having water inlet and discharge valves, an air admission passageway, an air exhaust passageway, valve means for obstructing said passageways one at a time, means for shifting the valve means to one position and time controlled means for shifting the valves means to the other position.

25. In combination, a pumping chamber having water inlet and discharge valves, an air admission port, an air exhaust port, valve means for alternately obstructing said ports one at a time, a fluid pressure motor for moving the valve means to obstruct the admission port and time controlled means for moving the valve means to obstruct the exhaust port.

26. In combination, a pumping chamber having water inlet and discharge valves, means for admitting compressed air to the pumping chamber, an air exhaust valve, a fluid pressure motor for opening the exhaust valve upon emptying of the pumping chamber, and time controlled means for closing the exhaust valve when the pumping chamber has refilled.

27. In combination, a pumping chamber having water inlet and discharge valves, a compressed air admission valve, a fluid pressure motor for closing the admission valve upon emptying of the pumping chamber and time controlled means for opening the admission valve when the pumping chamber has been refilled.

28. In combination, a single cylinder pump comprising a pumping chamber having water admission and discharge valves, an exhaust port having a valve seat, an exhaust valve adapted to be applied to its seat when water has filled the pumping chamber, and being adapted to be held to its seat by the pressure of the compressed air within the chamber, a fluid pressure motor adapted to move the exhaust valve away from its seat when the water has been expelled from the pumping chamber, means to apply the exhaust valve to its seat a predetermined time interval after the escape of pressure from the chamber.

29. In combination, a pumping chamber having water inlet and discharge valves, means for admitting compressed air to the pumping chamber, an exhaust valve adapted to be held to its seat by the pressure of the compressed air within the pumping chamber, a fluid pressure motor for moving the exhaust valve away from its seat against pressure, said fluid pressure motor having lost motion connections with said exhaust valve, said lost motion connection comprising a spring for throwing the exhaust valve clear of its seat and time controlled means for applying the exhaust valve to its seat.

30. In combination, a pumping chamber having water inlet and discharge valves, air admission and exhaust valves of the puppet type, said valves lying in line with each other and being adapted to be moved in unison, a fluid pressure motor for operating said valves, a low level float controlling said motor, means for operating the valves in the opposite direction and a time controlled element governing said latter means.

31. In combination, a pumping chamber having water inlet and discharge valves, means for admitting compressed air to the pumping chamber, an exhaust valve of the puppet type adapted to be held to its seat by pressure within the pumping chamber, a fluid pressure motor for moving the exhaust valve from its seat against the pressure of the fluid in the chamber, a low level float controlling the effective application of pressure to the motor, spring means for applying the exhaust valve to its seat, and a time controlled element governing said spring means.

32. In combination, a pumping chamber having water inlet and discharge valves, means for admitting compressed air to the pump chamber, an air exhaust valve adapted to be held to its seat by the pressure within the chamber, a fluid pressure motor for opening said exhaust valve against the pressure, a lost motion connection between the fluid pressure motor and the exhaust valve, said connection comprising a pair of engaging shoulders normally held apart by a spring, a low level float controlling the motor to open the exhaust valve when water has been discharged from the pumping chamber, and time controlled means adapted to operate substantially at the same time that the water has refilled the pump chamber for applying the exhaust valve to its seat.

33. In combination, a pumping chamber having water inlet and discharge valves, air valve means controlling the individual pumping strokes, a fluid pressure motor element for operating said valve means, said motor element being exposed on one side to the fluid pressure within the pump chamber and on the other side to the fluid pressure in the water discharge main, means controlled by discharge of water from the pumping chamber for unbalancing said fluid pressures to operate said valve means in one direction, and time controlled means for making the return stroke of the motor to operate said valve means in the other direction.

34. In combination, a pumping chamber having water inlet and discharge valves, means for admitting compressed air to the pump chamber, an air exhaust valve, a fluid pressure motor element for operating said exhaust valve, said element being exposed on one side to the pressure within the pumping chamber and being exposed on the other side to the pressure in the water discharge line, means controlled by discharge of water from the pumping chamber for unbalancing said pressures to open the exhaust valve, and time controlled means for closing the exhaust valve.

35. In a pump, an air valve, a pumping chamber, a fluid pressure motor element for operating the air valve, normally exposed on one side to the fluid pressure in the pumping chamber, means controlled by the low level of the water within the pumping chamber for permitting said fluid pressure to become effective to operate the motor element to shift said valve means, and time controlled means for closing the exhaust valve.

36. In combination, a pumping chamber having water inlet and discharge valves, means for admitting compressed air to the chamber, an air exhaust valve adapted to be held to its seat by the pressure within the pumping chamber, a fluid pressure motor for opening the exhaust valve against the pressure within the chamber, and time controlled means for applying said exhaust valve to its seat.

37. In combination, a pumping chamber having water inlet and discharge valves, means for admitting compressed air to the chamber, an air exhaust valve adapted to be held to its seat by the fluid pressure within the chamber, a fluid pressure motor for moving the exhaust valve away from its seat against the pressure in the chamber, a low level float controlling the pressure motor, and a time controlled element for applying the exhaust valve to its seat.

38. In a pneumatic pump, a valve, a balanced fluid pressure motor element for operating the valve in one direction, low level means for disturbing the balance of pressures to initiate movement in said one direction, valve means for exhausting the pressure on one side of the element to complete a movement quickly in said one direction, said valve means being governed by said element and time controlled means for making the return stroke of the motor.

39. In a pneumatic pump, a balanced fluid pressure motor element, low level means for disturbing the balance to initiate movement in one direction, valve means for exhausting the pressure on the opposite side of the element to complete the movement quickly, said valve means being governed by said element, spring means for making the return stroke of the motor, and time controlled means governing said spring means.

40. In a pneumatic pump, a pumping chamber having water valves, means for admitting compressed air, an exhaust valve, a motor for opening said exhaust valve when water has been discharged from the pumping chamber, said motor having a fluid pressure chamber, a tubular connection communicating with the interior of the pumping chamber, a valve controlling said tubular connection for trapping fluid under pressure in said motor chamber, and a graduated orifice controlling the discharge of pressure from said chamber.

41. In a pump, a pumping chamber having water valves, an exhaust passageway, a fluid pressure passageway, valve means for alternately closing said passageways, a motor element operated in one direction by fluid pressure for shifting said valve means to close the fluid pressure passageway when water has been discharged from the pump chamber, means for trapping fluid under pressure in said motor, and spring means for shifting the valves to close the exhaust passageway, the action of said spring being controlled by the discharge of the pressure trapped in said motor.

42. In combination, a pumping chamber having water inlet and discharge valves, an air exhaust valve, a fluid pressure motor above the level of the liquid in the chamber at low level for opening said exhaust valve, a tubular connection controlling the entry of fluid pressure to the motor, means for maintaining a water seal about the end of said connection to insure the discharge of water into said motor, and a low level valve controlling the discharge of water into said motor through said connection.

43. In combination, a pumping chamber having water inlet and discharge valves, an air exhaust valve, a fluid pressure motor above the level of the liquid in the chamber at low level for opening said exhaust valve, a tubular connection controlling the entry of fluid pressure to the motor, means for maintaining a water seal about the end of said connection to insure the discharge of water into said motor, and a low level valve controlling the discharge of water into said motor through said connection, and a spring for making the return stroke of the motor.

44. In combination, a pumping chamber having water inlet and discharge valves, an air exhaust valve, a fluid pressure motor above the level of the liquid in the chamber at low level for opening said exhaust valve, a tubular connection controlling the entry of fluid pressure to the motor, means for maintaining a water seal about the end of said connection to insure the discharge of water into said motor, a low level valve controlling the discharge of water into said motor through said connection, and a spring for making the return stroke of the motor, said motor having a graduated orifice for permitting the dissipation of the fluid pressure admitted to the motor.

45. In a pneumatic pump, a pumping chamber having water inlet and discharge valves, means for admitting compressed air to the pumping chamber, an exhaust valve adapted to be held to its seat by pressure within the pumping chamber, a fluid pressure motor for moving the exhaust valve off its seat against the pressure within the chamber, said motor being located above the low water level of the pumping chamber, a connection between the motor and the interior of the chamber, said connection being invariably water sealed, and a low level valve controlling the effective application of pressure to the motor.

46. In a pneumatic pump, a pumping chamber having water valves, means for admitting compressed air, an exhaust valve adapted to be held to its seat by pressure within the pumping chamber, a fluid pressure motor having a connection with the interior of the pumping chamber for opening said exhaust valve against the pressure within the pumping chamber, a lost motion connection between said exhaust valve and said motor for permitting the exhaust valve to be moved ahead of the motor after the valve has been cracked from its seat, a low level float controlling the operation of said motor, said motor being located above the low water level in the pumping chamber.

47. In a pneumatic pump, a pumping chamber having water inlet and discharge valves, means for admitting compressed air to the pumping chamber, an exhaust valve adapted to be opened when water has been expelled from the pumping chamber, a fluid pressure motor for operating said exhaust valve, a low level float governing the operation of said motor, said motor comprising a chamber and a movable wall for the same, a fluid admission passageway for the motor, a valve controlled by operation of the motor to open the exhaust valve to close the motor chamber admission passageway, and spring means connected between the movable wall of the motor and said valve for holding said valve over the motor admission passageway until the pressure has been discharged from the motor chamber, said chamber having an orifice for permitting the discharge of pressure therefrom under the influence of said spring and means for restoring the exhaust valve to its seat after pressure has been discharged from the motor chamber.

48. In a pump of the class described, a head for the pump having an exhaust valve, a pressure motor below said exhaust valve, said motor having a pressure chamber with an opening below the exhaust valve, a movable member for the motor, means controlled by low level conditions within the pump for permitting the effective application of pressure to the motor, a spring cage connected to the movable motor member, a stem connected to the exhaust valve, a spring lying between the cage and the exhaust valve, said stem and cage having interengaging shoulders and spring means for applying the exhaust valve to its seat.

49. In a pneumatic pump, a balanced fluid pressure motor element adapted to be exposed on both sides to the pressure of the fluid within the pump, low level means for disturbing the balance to initiate movement of the element in one direction, valve means operated by the initial movement for exhausting the pressure on one side of the element to complete the movement initiated, means controlled by said completed movement for exhausting the pressure causing said movement, means independent of the pressure within the pump chamber for making the return stroke of said element and time controlled means governing the operation of said last named means.

50. In a pneumatic pump, a balanced fluid pressure motor element exposed on both sides to the pressure within the pumping chamber, low level means for disturbing the balance to initiate movement of the element in one direction, valve means actuated by said initial movement for exhausting the pressure on one side of the element to complete said initiated movement, and means independent of the level of water within the pump for making the return stroke of the motor.

51. In a pneumatic pump, a pumping chamber, a balanced fluid pressure motor element exposed on both sides to the fluid pressure within the pumping chamber, means controlled by low level for disturbing the balance to initiate movement of the element in one direction, valve means operated by said initial movement for further unbalancing the pressure to complete the initiated movement, means operated by said completed movement governing the exhaust of pressure causing the movement of the element, and a dash pot controlling the return stroke of the motor.

52. In a pneumatic pump, a fluid pressure chamber, a movable wall comprising a motor element for said chamber, a low level valve controlling the effective application of pressure to the motor element, a fluid pressure admission passageway for the fluid pressure chamber and a fluid pressure discharge passageway for said chamber and valve means controlled by the completion of the stroke in one direction for closing the admission passageway and means for making the return stroke of the motor element with said valve closed.

53. In a pneumatic pump, water inlet and discharge valves, means for admitting compressed air, an exhaust valve adapted to be held to its seat by the pressure within the pumping chamber, a fluid pressure motor for pulling the exhaust valve off of its seat when water has been discharged from the chamber, said motor having a fluid pressure chamber, a tubular connection leading into said chamber, a low level valve controlling the discharge of fluid through said tubular connection into said chamber.

54. In combination, a pumping chamber having water inlet and discharge valves, means for admitting compressed air to the pumping chamber, an exhaust valve adapted to be held to its seat by pressure, a fluid pressure motor operated by the pressure of the fluid within the pumping chamber for pulling the exhaust valve off of its seat against pressure, a lost motion connection between the motor and the valve, a motor chamber for the motor element, a tubular connection for admitting pressure to the chamber, and means for maintaining a water seal on said tubular connection, said motor being controlled by low level conditions for opening the exhaust valve.

55. In combination, a pumping chamber having water inlet and discharge valves, means for admitting compressed air, an exhaust valve adapted to be held to its seat by pressure within the pumping chamber, a diaphragm for moving the exhaust valve off of its seat against pressure, means for throwing the valve away from its seat after the diaphragm has started the valve to open, a tubular connection for the admission of water to said motor diaphragm, a valve controlling the entry of water to said tubular connection for operating the diaphragm and a spring for making the return movement of the diaphragm.

56. In a pneumatic pump, a pumping chamber having water valves, means for admitting compressed air to the chamber, an exhaust valve, a fluid pressure motor for opening the exhaust valve, low level float controlling the initial movement of the motor, means controlled by the initial movement for accelerating the movement of the motor and a sniffle hole or discharge port for permitting the slow discharge of pressure from the motor.

57. In a pneumatic pump, a pumping chamber having water valves, means for admitting compressed air, an exhaust valve adapted to be held to its seat by pressure within the pumping chamber, a motor comprising a chamber and a diaphragm, a tubular connection for permitting the entry of fluid into the motor chamber, a low level valve governing the discharge of fluid into said chamber through said connection, and a sniffle hole controlling the discharge of fluid from said motor chamber.

58. In a device of the class described, a pumping chamber having water inlet and discharge valves, means for admitting compressed air to the pumping chamber, an exhaust passageway, an exhaust valve adapted to be held to its seat by pressure within the pumping chamber, said exhaust valve governing said exhaust passageway, a fluid pressure motor lying below the exhaust valve, said motor comprising a chamber having a tubular connection immediately below the exhaust valve and adapted to be obstructed by the exhaust valve when in open position, and a movable member adapted to be moved by differences of pressure to open the exhaust valve from its seat and to obstruct the tubular connection of the motor with the pumping chamber, a lost motion connection between the movable member and the exhaust valve comprising a spring cage and a stem, and a spring between the cage and stem, a low level float controlling the forcing of pressure through said tubular connection into the chamber to move the movable member of the motor to open the exhaust valve and to trap fluid within the motor chamber and means for forcing the movable motor member in a direction to close the exhaust valve, the action of said means upon the exhaust valve being delayed until the lost motion is taken up between the exhaust valve stem and the cage, said action consuming a predetermined amount of time and being controlled by the discharge of the fluid pressure trapped within the motor chamber through a sniffle hole or orifice in the walls of the motor chamber.

59. In a device of the class described, a motor chamber having a tubular connection for the entry of fluid pressure, a diaphragm forming one wall of said chamber, a balancing chamber on the other side of the diaphragm, a relief valve having a stem extending adjacent the diaphragm member when the diaphragm is in one extreme position, a passageway for admitting pressure to said balancing chamber, means controlling the application of a greater pressure to the motor chamber than to the balancing chamber, means for exhausting the pressure from the balancing chamber comprising the above mentioned relief valve, a spring for returning the diaphragm to its one extreme position, and means for trapping fluid pressure in the motor chamber for controlling the return of said diaphragm to its one extreme position, said means comprising a valve for the tubular connection.

60. In a pump, a pumping chamber, water valves and air valves, a fluid pressure motor for operating the valves in one direction, and a time controlled element for operating the valves in the other direction.

61. In a pump, a pumping chamber having water valves, an air exhaust valve of the puppet type closing with pressure, a motor for moving the exhaust valve off of its seat, said motor being operated by the fluid pressure within the chamber, means for trapping a predetermined amount of water in the pumping chamber for operating said motor, and a low level float controlling the discharge of said water into said motor for opening the exhaust valve.

62. In combination, a pumping chamber, water valves, means for admitting compressed air to the pumping chamber, an exhaust valve, a fluid pressure motor for operating the exhaust valve, means for trapping a predetermined amount of water in the pump chamber, and a low level float controlling the discharge of said water into the motor for opening the exhaust valve.

63. In combination, a pumping chamber having water valves, means for admitting compressed air, an exhaust valve adapted to be held closed by pressure within the pumping chamber, a fluid pressure operated motor adapted to be operated by the pressure within the pumping chamber, means within the pumping chamber for trapping a predetermined quantity of water, said water being adapted to be forced into the pressure motor, and a low level valve controlling the forcing of said water into the pressure motor, and a lost motion connection between the exhaust valve and the pressure motor for permitting the valve to be thrown away from its seat after it once starts to open.

64. In a pump, a pumping chamber having water inlet and discharge valves, means for admitting compressed air to the pumping chamber, an exhaust valve held to its seat by pressure in the pumping chamber, a fluid pressure motor for opening said exhaust valve, said motor having an element normally balanced by fluid pressures, a low level float for disturbing said balance for opening the exhaust valve and time controlled means for the motor governing the closing of said exhaust valve.

65. In combination, a pump chamber having water inlet and discharge valves, means for admitting motive fluid, a balanced pressure motor, an exhaust valve adapted to be held to its seat by pressure and moved from its seat by said motor, means controlled by low level of water within the pumping chamber for unbalancing the pressures on said motor element, and a relief valve on one side of the motor element, said relief valve opening to the exhaust port on the atmospheric side of the exhaust valve.

66. In combination, a pumping chamber having water inlet and discharge valves, an air admission valve, an exhaust port, an exhaust valve adapted to close the port when water has filled the pumping chamber and to be held to seat by the fluid pressure in the pumping chamber, a fluid pressure motor controlled by low water level in the pumping chamber for moving the exhaust valve away from its seat against the pressure in the chamber, and a spring adapted to apply the exhaust valve to its seat when there is no fluid pressure in the pumping chamber.

67. In a pneumatic pump the combination with a pump chamber and a valve for admitting compressed air to said pump chamber, of fluid actuated means for operating said valve, and means adapted to move said fluid actuated means and said valve to retain said valve in one of its extreme positions when there is no air pressure on the pump.

68. In a pneumatic pump the combination of a pump chamber, an air valve, a fluid motor comprising a cylinder and a piston and means for permitting water to be forced from the pump chamber to the cylinder to actuate the piston and the air valve, the cylinder being provided with a bleed hole in the top thereof.

69. In a pneumatic pump the combination with a pump chamber provided with water inlet and outlet valves, of an air valve and a fluid motor for actuating said air valve, said motor being connected with the interior of the pump chamber and means for maintaining a water seal between the motor and the air in the pump chamber for pressure and exhaust.

70. In a pneumatic pump the combination with a pump chamber provided with water inlet and outlet valves, of an air valve and a fluid motor for actuating said air valve, said motor being connected with the interior of the pump chamber, means for maintaining a water seal between the motor and the air in the pump chamber for pressure and exhaust, and a low level float governing the forcing of the water into the motor to actuate the air valve.

71. In combination, a pumping chamber, a pump chamber having water inlet and discharge valves, an air admission valve, an air exhaust valve, a pressure motor for opening the exhaust valve and closing the admission valve when the water has been discharged from the pump chamber, and a spring for holding the admission valve open and the exhaust valve closed when there is no pressure on the pump.

72. In combination, a pumping chamber having water inlet and discharge valves, means for admitting compressed air to the chamber, an exhaust valve, a pressure motor for opening the exhaust valve when water has been discharged from the pump chamber, means for trapping a body of water in the pump chamber and a low level float controlling the forcing of said water into the motor to open the exhaust valve.

73. In combination, a pumping chamber having water inlet and discharge valves, means for admitting compressed air to the chamber, an exhaust valve, a pressure motor for opening the exhaust valve when water has been discharged from the pump chamber, means for trapping a body of water in the pump chamber, and a low level float controlling the forcing of said water into the motor to open the exhaust valve, and means for forcing the water out of the motor before the exhaust valve is applied to its seat.

74. In combination, a single cylinder pump, a source of compressed air, an air spring connected to the pump and a closed faucet controlled delivery system connected to the pump and tank, said pump comprising valves for liquid, a main air valve mechanism, a pressure motor controlled by low level of liquid in the pump to shift the main air valve to exhaust position and time controlled means governing the closing of the exhaust.

75. In combination a single cylinder pump, a source of compressed air, an air spring connected to the pump and a closed faucet controlled delivery system connected to the pump and air spring, said pump comprising valves for liquid, a main air valve mechanism, a pressure motor controlled by low level of liquid in the pump to shift the main air valve to cut off further admission of compressed air and time controlled means for shifting the valve to readmit compressed air.

76. In combination, a pump chamber, valves for liquid, an exhaust valve of the puppet type adapted to be held to seat by pressure, means for admitting compressed air to the pump chamber, a motor chamber having a movable motor member, a connection between the motor chamber and the pump chamber, a low level control device governing the movement of said motor member by fluid under pressure admitted to the motor chamber, and valve means for trapping fluid in said motor chamber to hold the exhaust valve open.

77. In combination, a pump chamber, valves for liquid, an exhaust valve of the puppet type adapted to be held to seat by pressure, means for admitting compressed air to the pump chamber, a motor chamber having a movable motor member, a connection between the motor chamber and the pump chamber, a low level control device governing the movement of said motor member by fluid under pressure admitted to the motor chamber and valve means for trapping fluid in said motor chamber, said motor chamber having a leakage port for permitting the escape of said trapped fluid.

78. In combination, a single pumping chamber having water inlet and discharge valves, a closed faucet controlled delivery system connected to said pumping chamber, compressed air admission and exhaust valve means, a fluid pressure motor for operating the air valve means and a time controlled element governing said air valve means.

79. In combination, a pumping chamber having water inlet and discharge valves, means for admitting compressed air to the chamber, an exhaust valve, a fluid pressure motor for opening the exhaust valve, means controlled by low level in the pumping chamber governing the operation of said motor, and time controlled means for closing the exhaust valve.

In witness whereof I hereunto subscribe my name this 10th day of November, 1919.

BURTON S. AIKMAN.